(12) United States Patent
Pawelzik et al.

(10) Patent No.: US 7,171,984 B2
(45) Date of Patent: Feb. 6, 2007

(54) MIXER TAP

(75) Inventors: Manfred Pawelzik, Soest (DE); Fred Hannemann, Herzberg (DE)

(73) Assignee: Grohe Water Technology AG & Co. KG, Hemer (DE)

( * ) Notice: Subject to any disclaimer, the term of this patent is extended or adjusted under 35 U.S.C. 154(b) by 210 days.

(21) Appl. No.: 10/491,584

(22) PCT Filed: Jul. 25, 2003

(86) PCT No.: PCT/EP03/08234

§ 371 (c)(1),
(2), (4) Date: Feb. 21, 2005

(87) PCT Pub. No.: WO2004/027299

PCT Pub. Date: Apr. 1, 2004

(65) Prior Publication Data

US 2005/0115617 A1    Jun. 2, 2005

(30) Foreign Application Priority Data

Aug. 21, 2002 (DE) ............................... 102 39 177

(51) Int. Cl.
*E03B 1/00* (2006.01)
(52) U.S. Cl. .................. 137/606; 251/248; 137/625.41

(58) Field of Classification Search ................ 137/606, 137/625.41, 625.31, 625, 625.44; 251/248
See application file for complete search history.

(56) References Cited

U.S. PATENT DOCUMENTS

| 2,633,872 | A | * | 4/1953 | Hennessey | 137/606 |
|---|---|---|---|---|---|
| 3,067,771 | A | * | 12/1962 | Reddi | 137/606 |
| 3,511,279 | A | * | 5/1970 | Hancock | 137/606 |
| 3,584,654 | A | * | 6/1971 | Deloye | 137/606 |
| 5,950,663 | A | * | 9/1999 | Bloomfield | 137/606 |

FOREIGN PATENT DOCUMENTS

| DE | DE 38 20 855 | 8/1989 |
|---|---|---|
| FR | FR 2 565 658 | 12/1985 |

* cited by examiner

*Primary Examiner*—Eric Keasel
*Assistant Examiner*—Cloud Lee
(74) *Attorney, Agent, or Firm*—Andrew Wilford

(57) ABSTRACT

A mixing valve has a housing having hot- and cold-water inlets and at least one hot-, cold-, or mixed-water outlet. Respective hot- and cold-water valves in the housing each have a valve stem rotatable to control flow through the respective valve and carrying a respective externally toothed gear. Respective hot- and cold-water control rings rotatably mounted about a common axis on the housing each have internal teeth in continuous mesh in all angular positions of the valves and rings with the gears of the respective valves.

20 Claims, 5 Drawing Sheets

MIXER TAP

CROSS REFERENCE TO RELATED APPLICATIONS

This application is the US national phase of PCT application PCT/EP03/08234, filed 25 Jul. 2003 and claiming the priority of German patent application 10239177.7 itself filed 21 Aug. 2002.

FIELD OF THE INVENTION

The invention relates to a mixing faucet with a housing having hot- and cold-water inlets and at least one hot-, cold-, or mixed-water outlet and holding two parallel valves for separate control of the hot and cold water, the two valves each having a valve stem that is connected at one end with a respective valve member and on the other side with a gear couplable with an actuator.

BACKGROUND OF THE INVENTION

Such a mixing valve is known from German 38 20 855. In this mixing valve a relatively large-diameter dome-shaped and squat knob serves for controlling both the valves. To select hot water or cold water the user turns this knob in the appropriate direction, which can lead to mistakes. In addition the gears of the valve are not always in mesh with the teeth of the knob, so that they clash as the come together and rotation of the knob is often blocked.

OBJECT OF THE INVENTION

It is an object of the invention to provide a mixing valve with a simple and sure adjusting mechanism that is relatively slim and that is usable in many application.

SUMMARY OF THE INVENTION

This object is attained according to the invention in a mixing valve of the described type wherein the actuator comprises two control rings rotatably mounted on the housing and having internal teeth, the internal teeth of each of the control rings meshing in every angular position with a respective one of the gears of the respective valve.

The advantages achieved according to the invention are that use of the mixing valve is extremely easy for the user and operating errors can largely be ruled out. In addition the suggested structure of the mixing valve has a very slim design. In addition the mixing faucet can be provided with a spout laterally below or above the control rings.

According to a further embodiment of the invention the control rings can be provided with radially projecting actuating levers so that their operations is simplified.

In a preferred embodiment of the invention internal gears are fixed against rotation and generally without play in the control rings, the two control rings being provided with respective guide and mounting bushings that provide axial and radial support that is low in friction, easy to service, and that has a long service life. The lower control ring is thus supported by a bushing on the upper end of the housing while the upper control ring is braced by a bushing on a ring nut held on the headpiece, the ring nut being adjustable to set the axial play.

To decrease friction and increase the service life there is preferably in each of the gears mounted on the stems of the valves an axial screw that engages with its tip when installed in the support bearing in the headpiece so that radial force transmitted by the gear on the valve to the internal gear of each control ring can be solidly transmitted. In addition the individual gears on the valves are each provided with a respective projecting sleeve that fits in a tube mounted on the headpiece for further support.

When the spout is arranged above the control rings, preferably there is a pip nipple mounted on the headpiece that feeds the mixed water into the spout. Here preferably the ring nut is carried on an external screwthread of the pipe nipple. In this manner the spout can be pivotal or fixed. Fixing of the spout can preferably done by a separate holding screw of the ring nut that fits with an extended tip in a seat of the spout and provides the optional fixing.

BRIEF DESCRIPTION OF THE DRAWING

Embodiments of the invention are shown in the drawing and are more closely described in the following. In the drawing.

SPECIFIC DESCRIPTION

Figure 1:
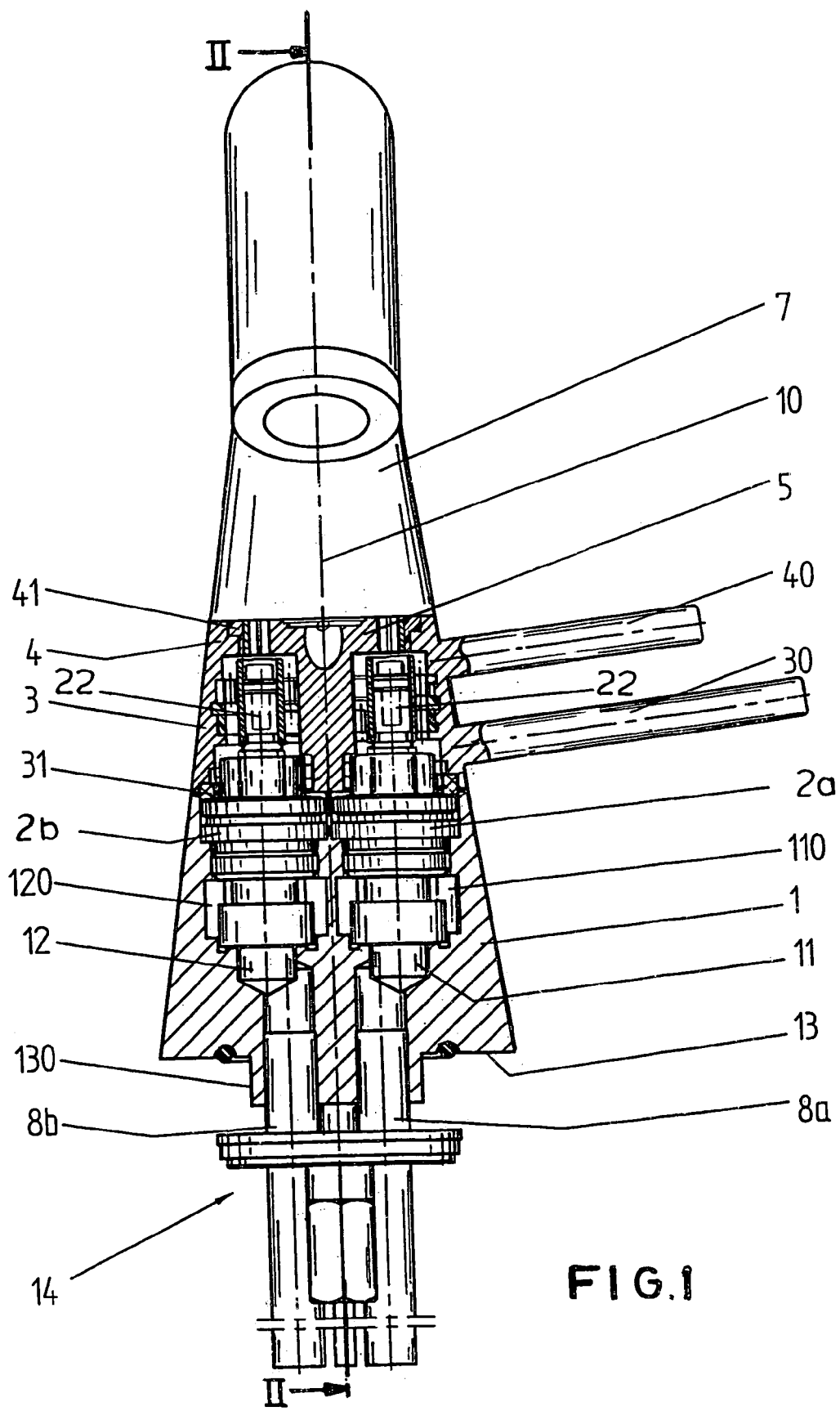
FIG. 1 is a partly sectional side view of the water mixing faucet.

For simplicity's sake the same or similar elements are denoted with the same references.

The water mixing valve shown in FIGS. 1 to 6 of the drawing has a housing 1, two valves 2a and 2b in the housing 1, two control rings 3 and 4, a headpiece 5 mounted on the housing 1, a ring nut 6 held on the headpiece 5, and a water spout 7. The housing 1 has an end support face 13 by means of which it sits on an unillustrated wash and/or rinse surface. In order to secure the water mixing valve on the wash and/or rinse surface there is also a standard mounting device 14 on the housing 1.

Figure 2:
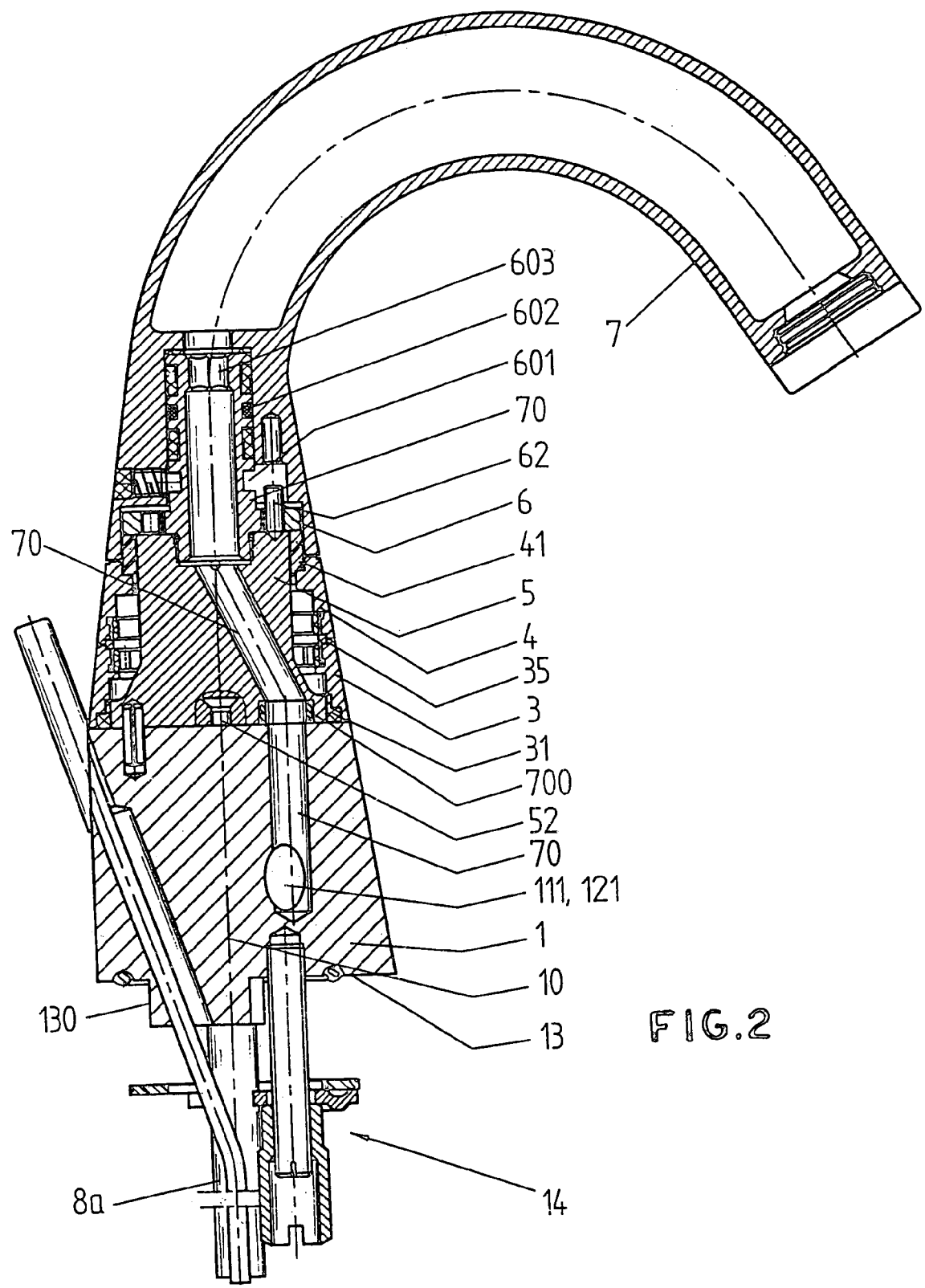
FIG. 2 is the water mixing faucet shown in FIG. 1 according to section plane II.

Near the support face 13 of the housing 1 is also an inlet fitting 8a for cold water and an inlet fitting 8b for hot water. The inlet fitting 8a communicates with a cold-water inlet compartment 11 and the inlet fitting 8b with a hot-water inlet compartment 12. The cold-water compartment 11 opens into the valve 2a while the hot-water compartment 12 opens into the valve 2b. The two valves 2a and 2b extend parallel to a central axis 10 of the housing 1 and are of standard rotary construction with relatively rotatable ceramic disks or are standard valve bodies. The cold water coming out of the valve 2a goes into a separate cold-water outlet compartment 110 and the hot water coming out of the valve 2b goes into a separate hot-water outlet compartment 120. The cold-water outlet compartment 110 and the hot-water outlet compartment 120 are connected via respective bores 111 and 121 with a mixed-water passage 70 in which the hot and cold water from the bores 111 and 121 mixes. The mixed-water passage 70 extends upward along the central axis 10 in the housing 1 as shown in FIG. 2 of the drawing. The two valves 2a and 2b are juxtaposed as closely as possible to the central axis 10 of the housing and are sealed by means of screwthreads and seal rings as is standard, the heads of the two valves 2a and 2b projecting out of the upper end of the housing 1. The housing 1 has a frustoconical outer surface that is visible to the user.

The headpiece 5 is secured by screws 52 (FIG. 2) to the upper end of the housing 1. The mixed-water passage 70 is sealed at its end with a seal 700 and has a region running at an angle to the axis 10 in the headpiece 5. The headpiece 5 has cutouts for the portions of the valves 2a and 2b projecting from the housing 1.

Figure 3:
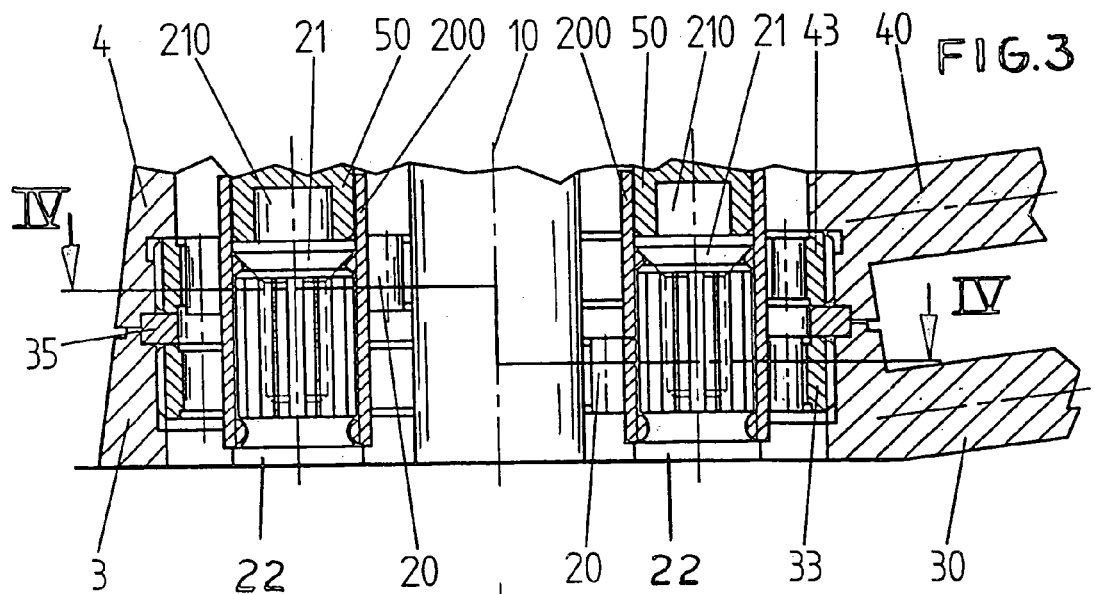
FIG. 3 is an enlarged-view detail of the water mixing faucet shown in FIG. 1 in the region of the control rings.
Figure 4:
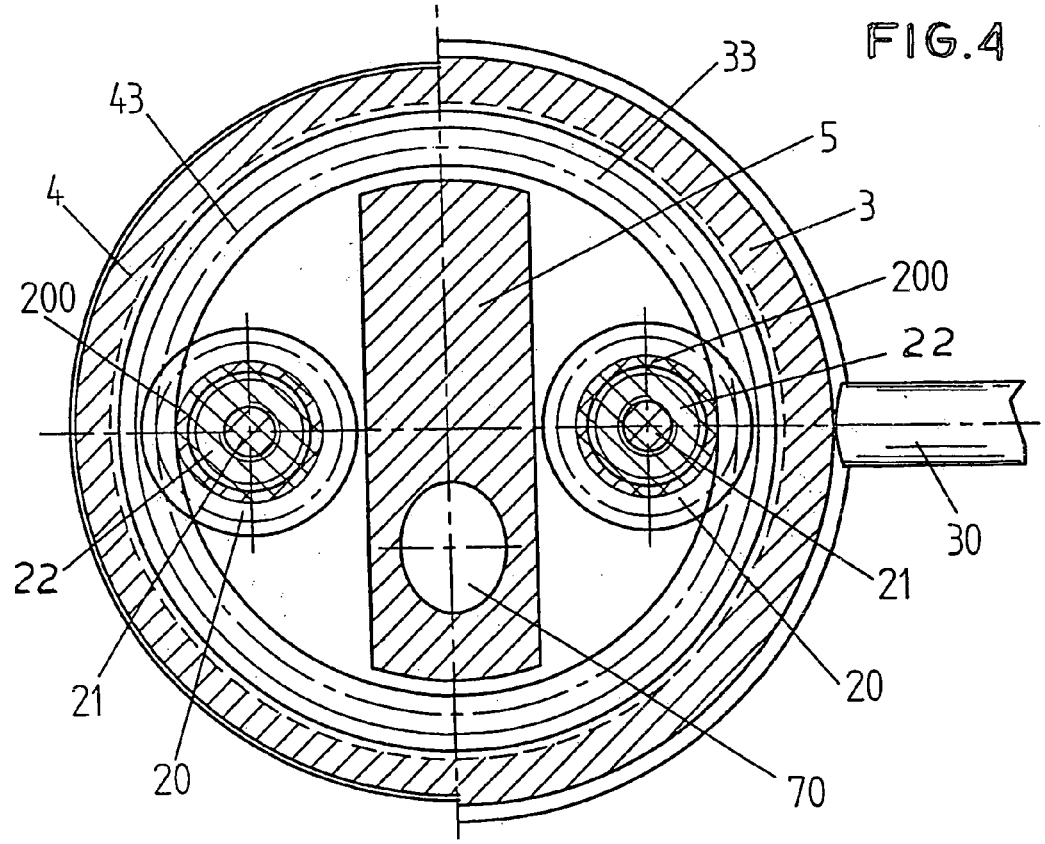
FIG. 4 is a section taken along line IV of FIG. 3.
Figure 5:
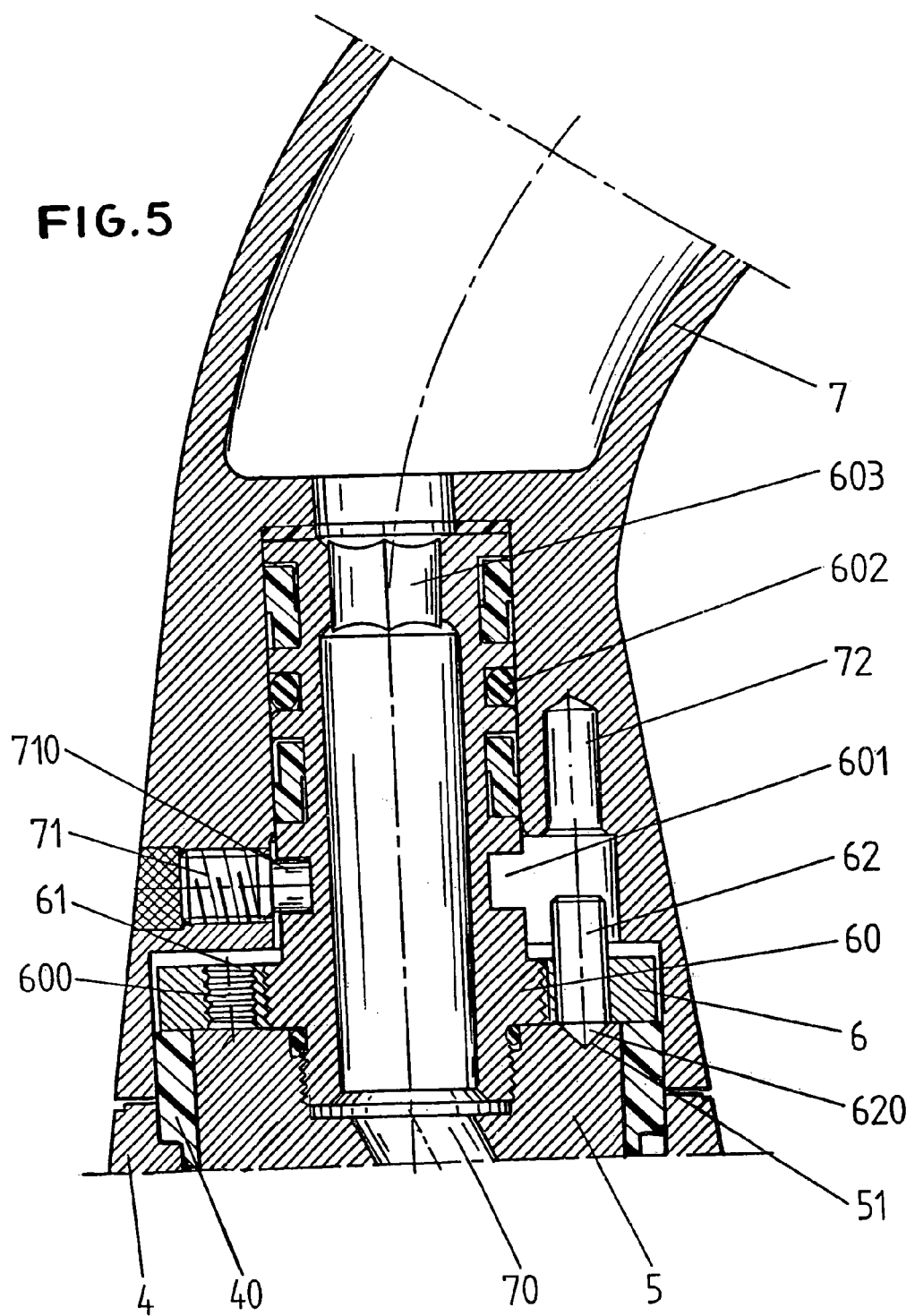
FIG. 5 is a detail of the water mixing valve of FIG. 2 in enlarged view.
Figure 6:
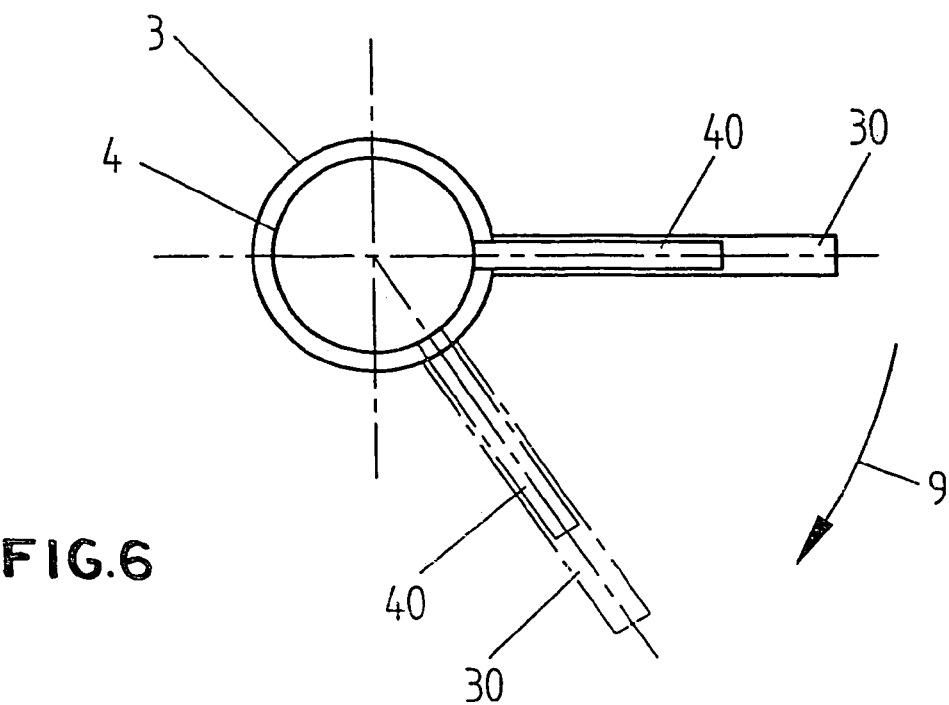
FIG. 6 is a top view of the control rings shown in FIG. 1 with their levers, the lever positions of the open-valve positions shown in dashed lines.

As in particular shown in FIGS. 3 and 4 of the drawing, respective gears 20 are mounted on the projecting stems of the valves 2a and 2b. Screws 21 in the stems of the valves 2a and 2b axially fix the gears 20. The screws 21 each have an axially upwardly extending cylindrical pin 210 that engages in a respective tube 50 of the headpiece 5. In addition the gears 20 are each provided with an axially projecting sleeve 200 that surrounds the respective tubes 50 for further support. One of the gears 20 meshes with inside teeth of a gear 33 of the lower control ring 3 while the other gear 20 meshes with inside teeth of a gear 43 of the upper control ring 4. The gear 43 is secured by splines to the control ring 4 and the gear 33 is similarly rotationally coupled by splines with the control ring 3. Rotation of one or both of the control rings 3 and 4 about the central axis 10 thus is transmitted from the respective rings 3 and 4 to the valves 2a and 2b.

Bushings 31, 35, and 41 of very low-friction and wear-resistant material support the control rings 3 and 4. The bushing 31 bears on an upper end of the housing 1 while the upper bushing 41 bears radially on the headpiece 5 and axially on the ring nut 6. The two bushings 31 and 41 each have a cylindrically stepped outer surface with the cylindrical surface forming a radial bearing surface while the step on the bushing 31 forms a shoulder and the step on the bushing 41 a shoulder that work as axial bearing surfaces. The middle bushing 35 between the control rings 3 and 4 is of rectangular section and provides for sliding support and axial positioning of the gears 33 and 43 in the rings 3 and 4 as shown in particular in FIG. 3 of the drawing. The outer surfaces of the control rings 3 and 4 are, like the housing, of frustoconical shape so that there is a smooth continuous transition from the outer surface of the housing 1 to that of the control rings 3 and 4 and the water spout 7.

The control ring 3 for the valve 2a is provided with a radially outwardly extending lever 30. Similarly the control ring 4 has a radially projecting lever 40. The control lever 30 for the valve 2a that controls cold-water flow is here somewhat longer than the control lever 40 that controls hot-water flow. As in particular shown in FIG. 6 of the drawing, in the closed positions of the valves 2a and 2b, the respective levers 30 and 40 extend in the same direction generally at a right angle to the front of the user. Each lever 30 and 40 can be moved separately from the closed position as shown by arrow 9. In the dashed-line position of the control levers 30 and 40 the respective valves 2a and 2b are in the full open position, so that in this position the valves deliver the same amounts of hot and cold water to the mixing passage 70 and correspondingly tempered mixed water flows out of the water spout 7. Thus if both levers 30 and 40 are simultaneously moved from the closed positions in the direction of arrow 9 the overall flow of mixed water is increased uniformly. Of course the two levers 30 and 40 can be operated independently of each other so that the overall flow and the mixed-water temperature are independently variable.

A pipe nipple 60 is threaded into the upper end of the headpiece 5 and the mixed-water passage 70 opens into this nipple 60. The outer surface of the pipe nipple 60 has above the end of the headpiece 5 a screwthread 61 carrying the ring nut 6. The ring nut 6 itself has four symmetrically spaced threaded bores 600 in each of which a holding screw 62 can be screwed. Alternatively of course there could be six or eight symmetrically arrayed threaded bores. In addition two diametrically opposite holding screws could be provided in the ring nut for symmetrical loading of the ring nut. In order to set the axial play of the control rings 3 and 4 in the bushings 31, 35, and 41, the ring nut 6 is torqued down on the screwthread 61 and then backed off until the next bore 600 is aligned with a conical seat 51 of the headpiece 5. Then a holding screw 62 can engage with its conical tip 620 in the conical seat 51, fixing the ring nut 6 in its angular position, and the axial play is set.

The downstream end region of the pipe nipple 60 carries an external seal ring 602 that seals in a bore 603 of the water spout 7. Upstream of the seal ring 602 there is a groove 601 which in assembled condition receives a screw 71 that is set in the spout 7 and whose tip 710 projects radially into the groove 601, thereby axially fixing the spout 7 on the pipe nipple 60 while leaving it free to pivot. Should it be desired to make the spout 7 nonpivotal, that is fixed on the housing 1, the illustrated holding screw 62 is not used and is replaced with a different holding screw with an axially projecting pin that when installed engages in a seat 72 of the spout 7 and thus fixes the spout 7 against rotation.

The above-described mixing faucet is set up for mounting on a wash and/or rinse surface. Of course the mixing faucet according to the invention could also be used with appropriate connections as a wall-mount or other system.

Figure 7:
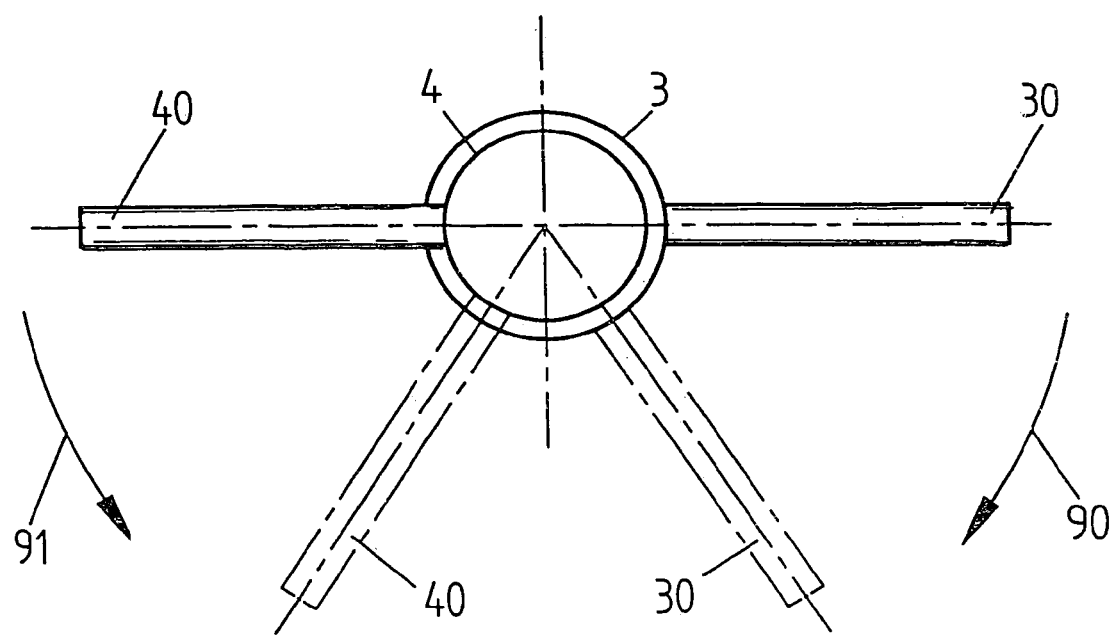
FIG. 7 is the control rings with their levers for another water mixing valve in top schematic view, the open-valve positions of the adjustment levers being shown in dashed lines.

FIG. 7 of the drawing shows a different arrangement of the levers 30 and 40 for actuating different valves 2a and 2b. In the closed positions, the levers 30 and 40 are 180° offset from one another. If the lever 30 is swung in the direction of an arrow 90, the cold-water valve is uniformly opened. In the dashed-line position of the lever 30 the cold-water valve is fully open. If the lever 40 is swung in the direction of an arrow 91, the hot-water valve is uniformly opened. In the dashed-line position of the lever 40 the hot-water valve is fully open.

The invention claimed is:

1. A mixing valve comprising:
   a housing having hot- and cold-water inlets and at least one hot-, cold-, or mixed-water outlet;
   respective hot- and cold-water valves in the housing each having a valve stem rotatable to control flow through the respective valve;
   respective externally toothed gears fixed on the valve stems; and
   respective hot- and cold-water control rings rotatably mounted about a common axis on the housing and each having internal teeth in continuous mesh in all angular positions of the valves and rings with the gears of the respective valves.

2. The mixing valve defined in claim 1 wherein the housing and rings have outer surfaces that are generally all flush with one another.

3. The mixing valve defined in claim 2 wherein the outer surfaces of the housing and rings are all frustoconical.

4. The mixing valve defined in claim 3, further comprising a spout having a frustoconical surface flush with and abutting the surfaces of the control rings.

5. The mixing valve defined in claim 1 wherein each of the control rings has a respective radially projecting lever.

6. The mixing valve defined in claim 5 wherein each of the valves is movable between a respective closed position and a respective open position, the levers being axially aligned in the closed positions of the respective valves.

7. The mixing valve defined in claim 5 wherein each of the valves is movable between a respective closed position and a respective open positions, the levers being diametrally opposite each other in the closed positions of the respective valves and being movable in opposite angular directions for displacement of the respective valves into the open positions.

8. The mixing valve defined in claim 1, further comprising:
   a headpiece on the housing and having an end turned away from the housing and formed with a screwthread; and
   a nut threaded on the headpiece end and axially bracing the control rings against the housing.

9. The mixing valve defined in claim 8, further comprising an inner bushing slidably and rotatably bracing one of the control rings against the housing; an outer bushing slidably and rotatably bracing the other of the control rings against the nut; and a middle bushing slidable and rotatably bracing the control rings axially against each other.

10. The mixing valve defined in claim 9 wherein the inner and outer bushings are generally inside the respective control rings and have stepped outer surfaces bearing axially and radially outwardly against the respective control rings.

11. The mixing valve defined in claim 1, further comprising
   a headpiece mounted on the housing, the valves and the respective gears being generally between the housing and the headpiece;
   respective screws securing the gears on the valves and each having an end pin extending axially toward the headpiece; and
   means forming respective axially open seats on the headpiece complementarily and rotatably receiving the screws.

12. The mixing valve defined in claim 1 wherein the housing is formed by hot- and cold-water outlet compartments at the respective valves and with a mixed-water passage into which both of the outlet compartments opens and which extends axially in the housing away from the valves and which opens axially on the housing.

13. The mixing valve defined in claim 12, further comprising
   a head piece rotatably carrying the control rings and fixed axially on the housing, the mixed-water passage having a portion extending axially offset from the axis and a portion extending at an angle to the axis in the headpiece and having an outer end at the axis.

14. The mixing valve defined in claim 1, further comprising a headpiece fixed on the housing, rotatably carrying the control ring, and having a side turned away from the housing; an axially extending and centered nipple mounted on the side of the headpiece and into which the mixed-water passage opens; and a spout carried on the nipple.

15. The mixing valve defined in claim 14 wherein the nipple is externally threaded, the valve further comprising;
   a nut threaded on the nipple and having offset from the axis an axially throughgoing internally threaded bore, the headpiece being formed offset from the seat with an axially open seat open toward the nut and alignable axially with the bore; and
   a screw threaded into the bore and engageable in the seat to rotationally lock the nut on the nipple.

16. The mixing valve defined in claim 15 wherein the nut is formed with a plurality of the bores offset angularly on the nut about the axis, the screw being threadable into any of the bores.

17. The mixing valve defined in claim 14 wherein the nipple is formed with a radially outwardly open outer groove, the valve further comprising:
   a screw radially threaded into the spout and having a radial inner end engageable in the outer groove, whereby the screw locks the spout axially to the nipple while permitting the spout to pivot about the axis on the nipple.

18. The mixing valve defined in claim 17 wherein the housing is formed between the outer groove and the housing with an inner groove, the valve further comprising:
   a seal ring seated in the inner groove and engaging the spout.

19. The mixing valve defined in claim 17 wherein the spout is formed with an axially open seat in which the screw is engageable to rotationally lock the spout on the nut.

20. The mixing valve defined in claim 14 wherein the nipple has an outer end formed internally with a polygonal formation shaped to fit with a standard tool.

\* \* \* \* \*